United States Patent [19]

Grulke, deceased

[11] 3,928,529
[45] Dec. 23, 1975

[54] PROCESS FOR RECOVERING HCL AND FE₂O₃ FROM PICKLE LIQUOR

[75] Inventor: Carl A. Grulke, deceased, late of Berea, Ohio, by Elizabeth N. Grulke, executrix

[73] Assignee: Union Carbide Corporation, New York, N.Y.

[22] Filed: Mar. 9, 1973

[21] Appl. No.: 339,890

Related U.S. Application Data

[63] Continuation-in-part of Ser. No. 171,441, Aug. 13, 1971, abandoned.

[52] U.S. Cl. ............... 423/138; 423/481; 423/488; 423/633
[51] Int. Cl.² ..................... C01G 49/06; C01B 7/08
[58] Field of Search ........... 423/481, 138, 633, 488

[56] References Cited
UNITED STATES PATENTS

| | | |
|---|---|---|
| 2,428,221 | 9/1947 | Hudson .......................... 423/481 X |
| 3,172,915 | 3/1965 | Borkowski ........................ 260/614 |
| 3,198,743 | 8/1965 | MacCallum et al. ........... 423/633 X |
| 3,399,964 | 9/1968 | Michels et al. ................. 423/633 X |
| 3,442,608 | 5/1969 | Addinall et al. ..................... 423/488 |
| 3,542,508 | 11/1970 | Sercombe et al. .................. 423/138 |
| 3,658,483 | 4/1972 | Lienau et al. .................... 423/481 X |

*Primary Examiner*—Edward Stern
*Attorney, Agent, or Firm*—Israel Blum

[57] ABSTRACT

Regeneration process for spent pickle liquor comprising the oxidizing of an aqueous solution of ferrous chloride and hydrochloric acid in the presence of activated carbon to form aqueous ferric chloride which in turn is hydrolyzed to about 232°C. on a graphite hearth to yield vaporized hydrochloric acid and iron oxide.

11 Claims, 1 Drawing Figure

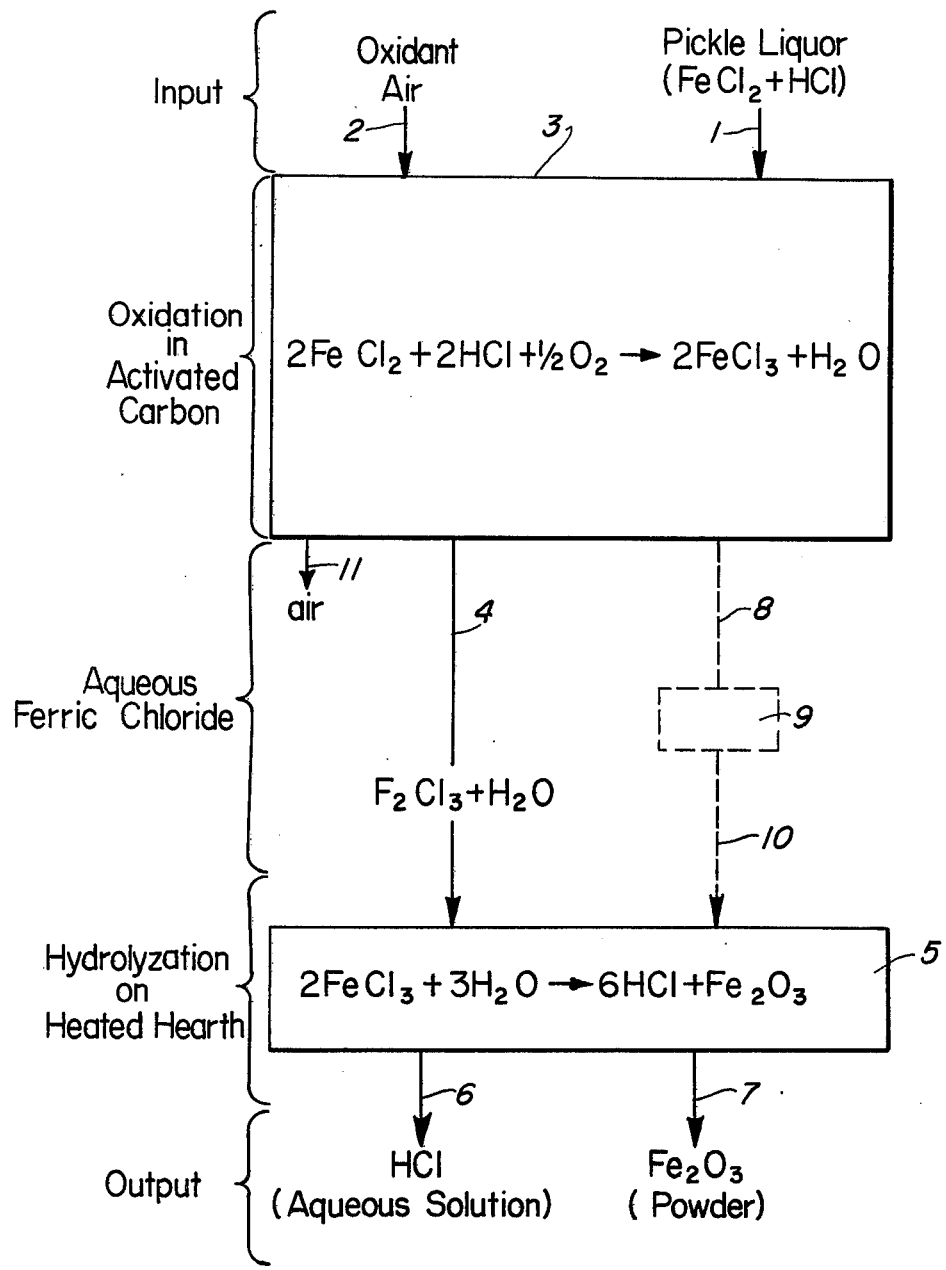

PROCESS FOR RECOVERING HCl AND $Fe_2O_3$ FROM PICKLE LIQUOR

RELATED APPLICATIONS

This application is a continuation-in-part of U.S. patent application Ser. No. 171,441 entitled "Process For Recovering HCl and $Fe_2O_3$ From Pickle Liquor" filed Aug. 13, 1971 by C. A. Grulke, now abandoned.

FIELD OF THE INVENTION

This invention relates to a process for recovering hydrochloric acid and iron oxide from spent pickle liquor by first oxidizing it in the presence of activated carbon and then hydrolyzing it at a temperature of 232°C.

DESCRIPTION OF PRIOR ART

Hydrochloric acid pickling is rapidly replacing sulfuric acid as the preferred method of steel pickling. The improved surface quality of steel pickled with hydrochloric acid is evident from the absence of "smut" carried over from the pickle line, the elimination of rolled-in scale, salt and pepper scale, and material which is over or underpickled. One disadvantage, however, is that hydrochloric acid pickling requires a good regeneration system because the hydrochloric acid pickling process yields a waste product, ferrous chloride, which causes a greater objectionable effluent problem than that caused by the ferrous sulfate obtained in sulfuric acid pickling processes.

Various processes for regeneration of hydrochloric acid waste pickle liquors for the recovery of acid values along with iron oxide have been tried but they have all suffered from drawbacks in their operations and/or in the products produced thereby. U.S. Pat. Nos. 2,785,957 and 2,785,999 disclose the concept of direct roasting of ferrous chloride slurries which result in the production of a hard, unworkable sludge of partial hydrate of ferrous chloride which is of little commercial value and which represents substantial chloride losses. Another regeneration process consists of semi-drying ferrous chloride and calcining it in the presence of oxygen, water and excess hydrochloric acid. This process, however, presents a very corrosive atmosphere for the equipment employed in the regeneration process and thereby is economically disastrous for commercial applications.

Presently spent hydrochloric acid is collected, concentrated and thereafter disposed in deep wells. In addition to the ecological effects this type of disposal may have on ground water supplies, the number of wells available for such disposal purposes is steadily decreasing.

One of the primary purposes of this invention is to provide a commercially feasible continuous system for regenerating spent hydrochloric acid to yield relatively pure hydrochloric acid along with high-purity iron oxide.

SUMMARY OF THE INVENTION

Broadly stated, this invention relates to a process for regeneration of an aqueous solution of metal chlorides and hydrogen chloride for the recovery of hydrochloric acid values and the production of metal oxides and in particular to the recovery of hydrochloric acid and iron oxide from spent pickle liquors.

Spent hydrochloric acid pickling liquor containing iron chloride along with an excess of HCl is permeated concurrently with an oxidant, such as air, through an activated carbon bed. The active carbon converts the oxygen bearing medium air to active oxygen which when present in a sufficient amount along with the HCl containing spent pickle liquor will cause substantially the following reaction:

$$2FeCl_2 + 2HCl + \tfrac{1}{2}O_2 \rightarrow 2FeCl_3 + H_2O \qquad (I)$$

The ferric chloride ($FeCl_3$), so formed, is then discharged in droplet form, preferably sized about 0.05 cubic centimeter, upon a preheated receiving plate, such as graphite, held at a temperature between about 115°C. and about 275°C.

The overall reaction of the ferric chloride and water reaction products from equation I in this heated environment is as follows:

$$2FeCl_3 + 3H_2O \rightarrow Fe_2O_3 + 6HCl \qquad (II)$$

Before this reaction in Equation II is substantially completed, it is believed that the hydrated hydrochloric acid solution is initially reacted to form dehydrated ferric chloride, a hydrated form of iron oxide, water and hydrochloric acid. The latter two products evaporate and are appropriately collected. The residual of evaporation produced a deliquescent form of dehydrated ferric chloride mixed with a hydrated form of iron oxide which is deposited on the surface of the heated hearth. The heat from the hearth further causes the deliquescent composite to react to substantially produce vaporized water and hydrochloric acid and a water entrapped deposit of hydrated iron oxide. After a sufficient layer of the latter accummulates on the hearth, the temperature of the hearth is increased to above the hydrate transition temperature of the deposite whereupon the chemically formed water is released substantially as steam which breaks up the iron oxide layer thus facilitating its removal.

The HCl product from reaction II is exhausted in the gaseous state with water (not shown in the reaction) whereupon it is collected and condensed in a conventional type corrosion resistant condenser, such as an impervious graphite heat exchanger or, more specifically, a Karbate heat exchanger. This squeous HCl is then ready for use in the further pickling of steel. HCl concentrations as high as 32% weight percent HCl is obtainable using this process.

If the concentration of the exhausted aqueous HCl is not sufficient for direct use in a steel pickling process, then a portion of the water content in Equation I can be evaporated prior to dispensing the reactants of this reaction onto the heated hearth. This can be accomplished by heating the solution of ferric chloride and water to a temperature below the dissociation temperature of the aqueous ferric chloride whereupon water can be evaporated. As long as the hydrochloric acid vapor pressure is maintained low by regulating the temperature to below the dissociation temperature of the aqueous ferric chloride, usually below 90°C., there will be little or no free HCl thus minimizing its loss. Generally, however, a negligible amount of HCl will usually be exhausted along with the water. The regulation of the water extraction by vaporization means can thereby be employed to regulate the concentrations of the aqueous hydrochloric acid output of this process.

In the heated plate environment, hydrated iron oxide ($Fe_2O_3$) accumulates on the plate in layer form and after a suitable buildup has occurred, for example between about one-eighth and about one-fourth inch, the $Fe_2O_3$ has to be removed so as not to interfere with the efficient operation of the regenerative process. This is accomplished by elevating the temperature of the hydrated $Fe_2O_3$ coated plate to above about 282°C. whereupon the hydrate is substantially removed thereby facilitating the scraping of the dried $Fe_2O_3$ material off the plate in chunk and/or powder form as described above. This removal step takes only minutes depending on the thickness of the deposited hydrated $Fe_2O_3$ layer. The $Fe_2O_3$ recovered will generally contain less than 1% ferrous iron and less than 2% chloride thus making it an ideal commercial product.

An alternate reaction place of equation I could be as follows:

$$3FeCl_2 + \tfrac{1}{2}O_2 + H_2O \rightarrow 2FeCl_3 + Fe(OH)_2 \quad \text{(III)}$$

The presence of $Fe(OH)_2$, however, would lead to an end product in the reaction of equation II of $Fe_3O_4$ instead of $Fe_2O_3$. Thus if iron oxide is the desired end product, then the reaction in equation I must be assured by having a sufficient amount of HCl for the oxidation of $FeCl_2$ to $FeCl_3$. For example, 27 percent $FeCl_2$ solution (by reagent) requires 7.7 percent HCl to be present. The spent pickle liquor must be either discharged from production line at this concentration of HCl or the HCl must be added to the $FeCl_2$ solution prior to the oxidation step. Thus if a discharging spent concentration, then an additional 12.5 percent by weight of a concentrated HCl solution (36% HCl contents) would have to be added to satisfy the reaction of equation I.

The conversion of $FeCl_2$ to $FeCl_3$ can be accomplished in a number of ways with oxidants such as an oxygen-containing medium (i.e., air), ozone, peroxide, persulfate, chlorine, powdered activated carbon, hydrated ferric oxide and the like. Basically, an air stream can permeate the $FeCl_2$ solution at ambient for about 200 hours to obtain a 50 percent conversion. However, if the temperature is elevated, this rate of conversion can be increased, i.e., for about every 10°C. increase in temperature, the rate of conversion can be increased about 1.8 times. The upper limit of this heated environment is about 110°C. since this temperature is the boiling point of HCl and water (20% concentration) and will cause the excess HCl to be driven off thereby causing the reaction of equation III to occur.

The addition of activated carbon (treated about 950°C. as described in U.S. Pat. No. 2,365,729) will increase the rate of oxidation since it provides a semi-dry gas-liquid interface during oxidation. Activated carbon prepared from such materials as coconut charcoal, lignin, petroleum coke, coal, and the like are admirably suited for this purpose.

An alternate method to the use of trickling spent pickle liquor through activated carbon particles is to simply disperse fine activated particles in the solution of ferrous chloride and hydrochloric acid and then aerate overnight to oxidize the solution. A disadvantage to this approach is that the carbon remains in the solution thus contaminating the ferrous oxide.

The aqueous ferric chloride reaction-product of equation I has to be heated to a temperature sufficient to hydrolyze it to form hydrated ferric oxide and hydrochloric acid, such temperature being between about 115°C. and about 275°C. This hydrolyzed reaction can be carried out in any heated environment although the employment of a heated hearth made of any material capable of withstanding high temperatures is preferable since the aqueous ferric chloride can be admirably sprayed onto the heated hearth so that the hydrated ferric oxide so formed is deposited thereon while the vaporized hydrochloric acid so formed can be exhausted to a conventional type condenser. Once the buildup of sufficient hydrated ferric oxide has been deposited on the heated hearth, about ⅛ inch thick, the feeding of aqueous ferric chloride onto the hearth is stopped and the temperature of the hearth is raised to between about 282°C. and about 700°C., preferably about 320°C. This hearth temperature is maintained for a time period sufficient to convert the water contained in the hydrated $Fe_2O_3$ to steam, which steam causes the $Fe_2O_3$ deposited on the hearth to substantially spill free from the hearth. The iron oxide layer thereon, will substantially spill free at this temperature as described above, and the remainder, if any, still adhering to the hearth, can then be easily scraped off. Upon completion, the hearth is cooled to below about 260°C. and the spraying of the aqueous ferric chloride solution can then be continued.

A preferred embodiment of this invention will be described in conjunction with the sole drawing which shows a schematic illustration of a flowsheet of the process of this invention. Spent pickle liquor containing between about 12 and about 28 percent ferrous chloride and at least sufficient hydrochloric acid to stoichiometrically satisfy the reaction:

$$2FeCl_2 + 2HCl + \tfrac{1}{2}O_2 \rightarrow 2FeCl_3 + H_2O$$

is fed via 1 concurrently with air via 2 into a tower 3 containing activated carbon particles of lignin-containing material sized between about 12 and about 50 Tyler mesh and preferably between about 12 and about 28 Tyler mesh. The activated carbon can be prepared in any conventional manner, such as expressed in U.S. Pat. No. 2,365,729; i.e., coconut charcoal carbon can be activated with nitric acid and treated at 950°C. in $CO_2$, or alternately with steam at 550°C. After either of these treatments, the carbon should be treated with CO at 950°C. for at least 10 minutes so as to prepare the surface with a semi-water repellent layer. The feed rate of the pickle liquor and oxidant through the activated carbon is variable with a rate for the former of about five cubic centimeters per minute per square inch of tower cross-sectional area and a rate for the latter of about 5 cubic feet per hour being preferably based on an activated carbon height of 3 feet.

The $FeCl_2$ is substantially oxidized in the activated carbon environment yielding $FeCl_3 + H_2O$ which is then fed via 4 in a spray form onto a graphite hearth 5 heated to about 232°C. The excess air in the activated carbon bed is discharged to the atmosphere or the like via 11. In the heated hearth environment, the aqueous ferric chloride is hydrolyzed producing hydrochloric acid vapor and a hydrated ferric oxide deposit on the hearth. The gaseous HCl is collected via 6 in a conventional condenser (not shown) having a temperature of below 60°C. whereupon it is converted into the liquid state in an aqueous solution of water and then delivered back as an input for the steel pickling process. The hydrated $Fe_2O_3$ deposited on the hearth can not be removed at the hydrolytic temperature of 232°C. and therefore the spray of aqueous ferric chloride must be temporarily suspended while the temperature of the hearth is raised to about 316°C. A deposited layer of about one-eighth inch of $Fe_2O_3$ at this elevated temperature will substantially snap off the hearth with no difficulty. The remainder of the $Fe_2O_3$, if any, still adhering to the hearth, can be scraped off and the total $Fe_2O_3$ produced can be collected via 7 in a container (not shown). The aqueous ferric chloride liquid spraying step can then be commenced and the process repeated.

When the HCl output is below a desired concentration then a conventional evaporator can be added between the oxidation step and the hydrolyzation step so as to deplete the water content of the aqueous ferric chloride being discharged from the carbon tower 3. To accomplish this, the aqueous ferric chloride from carbon tower 3 is fed via 8 into an evaporator 9 wherein it is heated below the dissociation temperature of the complex which is below about 90°C. After the desired amount of water is removed, the aqueous ferric chloride can be discharged from evaporator 9 and fed via 10 onto hearth 5 in drop form as described above.

By regulating the flow rates of the reactants of equations I and II, the cross-sectional area of the tower containing the activated carbon, the height of the activated carbon and the size of the hearth, the regenerated hydrochloric acid process of this invention can be made to perform on a continuous basis with short interruptions for the removal of ferric oxide as described above.

The following examples will illustrate the process of this invention.

EXAMPLE I

A glass cylindrical tower having a height of 36 inches and a diameter of 1.125 inches was filled with coconut charcoal type activated carbon prepared as described in U.S. Pat. No. 2,365,729. The activated carbon, sized 12 to 28 Tyler mesh, was deposited to a height of 36 inches within the tower. Spent pickle liquor containing 12 percent ferrous chloride and 10 percent hydrochloric acid was fed into the tower at a rate of 5 cubic centimeters per minute while concurrently air was fed in at a rate of 5 cubic feet per hour. The temperature within the tower varied from about 21°C. at the top, about 60°C. midway and about 28°C. near the bottom. In passing through the active carbon, the following reaction substantially occurred:

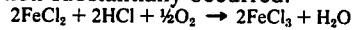
$2FeCl_2 + 2HCl + \frac{1}{2}O_2 \rightarrow 2FeCl_3 + H_2O$

The $FeCl_3$ and $H_2O$ was thereupon discharged in a liquid state and droplet form at a rate of 65 cubic centimeters per minute onto a 20 square inch graphite hearth heated to a temperature of 232°C. The aqueous ferric chloride was thereupon hydrolyzed to form hydrated $Fe_2O_3$ and HCl-containing vapor. The former remained deposited on the hearth surface while the latter was collected in a Karbate heat exchanger where it was condensed at a temperature about 60°C. After a ⅛ inch thick layer of hydrated ferric oxide had accummulated on the hearth, about 21 minutes of operating time, the discharge of the aqueous ferric chloride from the activated carbon tower was interrupted while the hearth was heated to about 316°C. Within 2 minutes, the ferric oxide was scraped off the surface of the hearth and the aqueous ferric chloride was again discharged onto the hearth which was cooled to 232°C.

The iron oxide recovered from this process was analyzed and found to contain less than 1% ferrous iron and less than 2% chloride.

EXAMPLE II

A glass cylindrical tower having a height of 36 inches and a diameter of 1.25 inches was filled with coconut charcoal type activated carbon prepared as described in U.S. Pat. No. 2,365,729. The activated carbon, sized 12 to 28 Tyler mesh, was deposited to a height of 36 inches within the tower. Spent pickle liquor containing 12 percent ferrous chloride and 10 percent hydrochloric acid was fed into the tower at a rate of 5 cubic centimeters per minute while concurrently oxygen was fed in at a rate of 1 cubic foot per hour. The temperature within the tower varied from about 21°C. at the top, about 60°C. midway and about 28°C. near the bottom. In passing through the active carbon, the following reaction occurred:

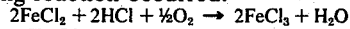
$2FeCl_2 + 2HCl + \frac{1}{2}O_2 \rightarrow 2FeCl_3 + H_2O$

The $FeCl_3$ and $H_2O$ was thereupon discharged in a liquid state and droplet form at a rate of 65 cc/min. onto a 20 square inch graphite hearth heated to a temperature of 232°C. The aqueous ferric chloride was thereupon hydrolyzed to form $Fe_2O_3$ and HCl-containing vapor. The former remained deposited on the hearth surface while the latter was collected in a Karbate heat exchanger where it was condensed at a temperature about 60°C. After about 21 minutes, a ⅛ inch thick layer of ferric oxide had accummulated on the hearth. The discharge of the aqueous ferric chloride from the activated carbon tower was thereupon interrupted while the hearth was heated to about 316°C. Within 2 minutes, the ferric oxide was scraped off the surface of the hearth and the aqueous ferric chloride was again discharged onto the hearth which was cooled to 232°C.

The iron oxide recovered from this process was analyzed and found to contain less than 1% ferrous iron and less than 2% chloride.

EXAMPLE III

A glass cylindrical tower having a height of 36 inches and a diameter of 2.75 inches was filled with coconut charcoal type activated carbon prepared as described in Example I. The activated carbon, sized 12 to 28 Tyler mesh was deposited to a height of 36 inches within the tower. Spent pickle liquor containing 12 percent ferrous chloride and 10 percent hydrochloric acid was fed into the tower at a rate of 30 cubic centimeters per minute while concurrently air was fed in at a rate of 30 cubic feet per hour. The temperature within the tower varied from about 21°C. at the top, about 60°C. midway and about 28°C. near the bottom. In passing through the active carbon, the following reaction occurred:

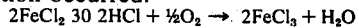
$2FeCl_2 \ 30 \ 2HCl + \frac{1}{2}O_2 \rightarrow 2FeCl_3 + H_2O$

The $FeCl_3$ and $H_2O$ was thereupon discharged in a liquid state and droplet form at a rate of 65 cc/min onto a 20 square inch graphite hearth heated to a temperature of 232°C. The aqueous ferric chloride was thereupon hydrolyzed to form $Fe_2O_3$ and HCl-containing vapor. The former remained deposited on the hearth surface while the latter was collected in a Karbate heat exchanger where it was condensed at a temperature about 60°C. After a ⅛ inch thick layer of ferric oxide had accummulated on the hearth, the discharge of the aqueous ferric chloride from the activated carbon tower was interrupted while the hearth was heated to 316°C. Within 2 minutes, the ferric oxide was scraped off the surface of the hearth and the aqueous ferric chloride was again discharged onto the hearth which was cooled to 232°C.

The iron oxide recovered from this process was analyzed and found to contain less than 1% ferrous iron and less than 2% chloride.

EXAMPLE IV

A glass cylindrical tower having a height of 36 inches and a diameter of 2.75 inches was filled with coconut charcoal type activated carbon prepared as described in Example I. The activated carbon, sized about 12 to 50 Tyler mesh, was deposited to a height of 36 inches within the tower. Spent pickle liquor containing 12 percent ferrous chloride and 10 percent hydrochloric acid was fed into the tower at a rate of 30 cubic centimeters per minute while concurrently oxygen was fed in at a rate of 6 cubic feet per hour. The temperature within the tower varied from about 21°C. at the top, about 60°C. midway and about 28°C. near the bottom. In passing through the active carbon, the following reaction occurred:

$$2FeCl_2 + 2HCl + \tfrac{1}{2}O_2 \rightarrow 2FeCl_3 + H_2O$$

The $FeCl_3$ and $H_2O$ was thereupon discharged in a liquid state and droplet form at a rate of 65 cc/min onto a 20 square inch graphite hearth heated to a temperature of 232°C. The aqueous ferric chloride was thereupon hydrolyzed to form $Fe_2O_3$ and HCl-containing vapor. The former remained deposited on the hearth surface while the latter was collected in a Karbate heat exchanger where it was condensed at a temperature about 60°C. After a ⅛ inch thick layer of ferric oxide had accummulated on the hearth, the discharge of the aqueous ferric chloride from the activated carbon tower was interrupted while the hearth was heated to 316°C. Within 2 minutes, the ferric oxide was scraped off the surface of the hearth and the aqueous ferric chloride was again discharged onto the hearth which was cooled to 232°C.

The iron oxide recovered from this process was analyzed and found to contain less than 1% ferrous iron and less than 2% chloride.

It is claimed:

1. A process for the regeneration of an aqueous solution of ferrous chloride and hydrochloric acid for the recovery of hydrochloric acid values along with iron oxide comprising the stages:
   a. oxidizing at a temperature between about ambient temperature and about 110°C an aqueous solution of ferrous chloride and hydrochloric acid with an oxidant in contact with activated carbon to form a reaction-product of aqueous ferric chloride;
   b. increasing the temperature of said reaction-product of aqueous ferric chloride to between about 115° and about 275°C to substantially hydrolyze it to hydrochloric acid vapor and hydrated iron oxide, said hydrated iron oxide accumulating on a substrate in layer form;
   c. recovering the hydrochloric acid formed in stage (b); and
   d. recovering the iron oxide.

2. The process of claim 1 wherein said oxidant is selected from at least one of the groups consisting of an oxygen containing medium, ozone, peroxide, persulfate, chlorine and hydrated ferric oxide.

3. The process of claim 2 wherein said oxygen-containing medium is selected from at least one of the groups consisting of air and oxygen.

4. A process for the regeneration of an aqueous solution of ferrous chloride and hydrochloric acid for the recovery of hydrochloric acid values along with iron oxide comprising the stages:
   a. oxidizing at a temperature between about ambient and about 110°C an aqueous solution of ferrous chloride and hydrochloric acid with an oxidant in contact with activated carbon to form a reaction-product of aqueous ferric chloride;
   b. feeding said aqueous ferric chloride in droplet form onto a heated hearth which increases the temperatures of said aqueous ferric chloride to between about 115° and about 275°C to substantially hydrolyze it to form hydrochloric acid vapor and hydrated iron oxide, said hydrated iron oxide accumulating on said hearth in layer form to a thickness of at least one-eighth inch;
   c. removing and condensing the hydrochloric acid formed in stage (b);
   d. suspending the feeding of said aqueous ferric chloride in said second stage while elevating the temperature of the hearth to above about 282°C to convert the water contained in the hydrated iron oxide to steam, which steam causes the iron oxide deposited on the hearth to substantially spill free from the hearth; and
   e. removing the iron oxide.

5. The process of claim 4 wherein the deposited build-up of hydrated iron oxide on the hearth is between about ⅛ and about ¼ inch thick in stage (b).

6. The process of claim 5 wherein after the iron oxide is removed, the hearth is cooled to below about 260°C and the feeding of the aqueous ferric chloride is resumed in accordance with stage (b).

7. The process of claim 6 wherein in stage (a), said oxidant is air and said activated carbon is a lignin containing material; wherein said temperature in said stage (b) is about 232°C; wherein said hydrochloric acid in stage (c) is condensed at a temperature below 60°C; wherein said iron oxide build-up on said hearth is about ⅛ inch thick before stage (d) is performed and wherein the temperature in stage (d) is about 320°C.

8. The process of claim 6 wherein said vaporized hydrochloric acid is condensed under corrosion resistant conditions at a temperature below 60°C.

9. The process of claim 6 wherein in stage (b), the size of the droplets is about 0.05 cubic centimeter and wherein in stage (a), said activated carbon is sized between about 12 and about 50 Tyler mesh size.

10. The process of claim 2 wherein in stage (a), the reaction-product of aqueous ferric chloride is fed through an evaporator to remove a portion of the water prior to stage (b) so as to control the concentration of the hydrochloric acid obtained in stage (c).

11. The process of claim 4 wherein in stage (a), the reaction-product of aqueous ferric chloride is fed through an evaporator to remove a portion of the water prior to stage (b) so as to control the concentration of the hydrochloric acid obtained in stage (c).

* * * * *